United States Patent
Tandon et al.

(10) Patent No.: US 10,827,345 B1
(45) Date of Patent: Nov. 3, 2020

(54) METHODS AND SYSTEMS FOR LORAWAN TRAFFIC ROUTING AND CONTROL

(71) Applicant: Syniverse Technologies, LLC, Tampa, FL (US)

(72) Inventors: Ravi Tandon, Sandweiler (LU); Huiyue Xu, Tampa, FL (US); Himanshu Garg, Punjab (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/887,476

(22) Filed: May 29, 2020

Related U.S. Application Data

(60) Provisional application No. 62/855,421, filed on May 31, 2019.

(51) Int. Cl.
*H04W 8/06* (2009.01)
*H04L 29/12* (2006.01)
*H04W 8/12* (2009.01)
*H04W 84/04* (2009.01)

(52) U.S. Cl.
CPC .......... *H04W 8/06* (2013.01); *H04L 61/1511* (2013.01); *H04W 8/12* (2013.01); *H04W 84/04* (2013.01)

(58) Field of Classification Search
CPC ......... H04W 8/06; H04W 8/12; H04W 84/01; H04L 61/15114
See application file for complete search history.

(56) References Cited

U.S. PATENT DOCUMENTS

2018/0124590 A1* 5/2018 O'Connell ............. H04W 8/02
2020/0107402 A1* 4/2020 Di Girolamo ........ H04W 48/17

OTHER PUBLICATIONS

LoRaWAN Alliance LoRaWAN 1.1 Specification Authored by the LoRa Alliance Technical Committee; Version 1.1; pp. 47 & 52-53 Date Oct. 11, 2017. (Year: 2017).*
LoRaWAN 1.0/1.0.x/1.1 Specification, LoRa Alliance, Inc., Oct. 11, 2017, https://lora-alliance.org/sites/default/files/2018-07/lorawan1.0.3.pdf.

* cited by examiner

*Primary Examiner* — Brandon J Miller
(74) *Attorney, Agent, or Firm* — Andriy Lytvyn Smith & Hopen, P.A.

(57) ABSTRACT

A system and method for routing LoRaWAN backend traffic between peer visited and home Network Server nodes to achieve global roaming in a scalable manner. A LoRaWAN Routing and Control System (LRCS) node is deployed between a visited Network Server and a home Network Server and is configured to proxy signaling and payload data messages therebetween. LRCS node can provide policy control, billing and rating based on roaming agreements between peer LoRaWAN roaming networks. LRCS node protects the overall network by discarding blacklisted and malicious traffic. LRCS node can enhance the message flow logic by adding routing information in the messages such that destination networks can identify that message is routed through a trustable source.

20 Claims, 16 Drawing Sheets

METHODS AND SYSTEMS FOR LORAWAN TRAFFIC ROUTING AND CONTROL

PRIORITY CLAIM

This non-provisional application claims priority to U.S. provisional application having Ser. No. 62/855,421 filed on May 31, 2019.

BACKGROUND OF THE INVENTION

1. Field of the Invention

This invention relates generally to the field of telecommunications networks. More specifically, the invention relates to a system and method for Long Range Wide Area Network (LoRaWAN) traffic routing and control.

2. Brief Description of the Related Art

Internet of Things (IoT) devices are ubiquitous and their number is increasing at a high pace. Unlike smartphones and computers, IoT devices transmit relatively small amount of data and transmissions are infrequent. Key considerations for implementation of IoT data transmission involve low power consumption and long-range transmission capability. Long Range Wide Area Network (LoRaWAN) is a low-power wide-area network protocol that satisfies both considerations.

LoRaWAN network protocol is described in LoRaWAN 1.0/1.0.x/1.1 specifications.

LoRaWAN protocol is optimized for battery-powered End-Devices that may be either mobile or mounted at a fixed location. Details of backend interfaces are described in LoRaWAN Backend Interfaces 1.0 specification.

Although LoRaWAN offers many advantages for connecting IoT devices, this protocol also has several unresolved challenges. One such challenge pertains to effective implementation of a roaming scheme.

The term "LoRaWAN roaming" refers to a scenario in which a LoRa device can transmit data to its Home Network operator while being connected to a different network—i.e., the Visited or Serving Network. In LoRaWAN roaming, there are two specified approaches for LoRa devices to access the Home Network. The first approach is called "Passive Roaming." In Passive Roaming, a serving Network Server (sNS) has the Gateway control, while the home Network Server (hNS) retains complete L2 control. The second LoRaWAN roaming scheme is called "Handover Roaming." In Handover Roaming, the sNS has both Gateway and L2 control, while hNS only acts as an anchor to receive device data and further exchanges the received data with an Application Server (AS).

Currently, roaming in LoRaWAN networks is limited. Obstacles to implementation of LoRaWAN roaming include the following: enabling routing between different networks is not specified, and bi party roaming agreements and routing setups are cumbersome, with no global methodology. The roaming procedure disclosed in LoRaWAN specifications does not address the need of global traffic routing among various operators and policy enforcement to manage the roaming agreements globally. LoRaWAN specification dictates that each network operator shall be configured with a roaming policy that can individually allow/disallow various type of roaming procedures with other network operators identified by their Network IDs. Implementing LoRaWAN roaming globally presents a challenge for individual networks. Thus, what is needed is a system and method for LoRaWAN traffic routing and control roaming solution that can enable global implementation of worldwide roaming in a secure manner.

SUMMARY OF THE INVENTION

As per LoRaWAN specification, each network operator should be configured with respective roaming policies, that can allow or disallow Passive Roaming, Handover Roaming, Passive Roaming based Activation, Handover Roaming based Activation of its individual End-Devices identified by the Device Extended Unique Identifier (EUI). This requirement poses an implementation challenge for LoRaWAN network operators because it requires the network operators to individually configure end-device-based policies. The invention resolves this issue by maintaining a global list of roaming agreements for each Device EUI belonging to LoRaWAN networks.

Based on roaming relationship between the visited network identified by Sender ID and Home network identified by Receiver ID, LoRaWAN Roaming Control System (LRCS) can readily discard the traffic from blacklisted networks or route the traffic from whitelisted networks to correct destination networks. In an embodiment, LRCS includes a Message Queuing Telemetry Transport (MQTT) broker that provides an interface to peer networks. In this manner, the peer network can directly subscribe to their respective Network ID or Device EUI topics to receive data through a publish procedure.

In an embodiment, the invention pertains to a method of routing LoRaWAN backend traffic based on Network Identifier retrieved from device address allocated during device activation procedure. Network Identifier can be used to identify the Home network for routing further uplink frames. In an embodiment, LRCS is configured to function like a LoRaWAN message aggregator, thereby providing a centralized store for the peer networks to retrieve application level messages directly from LRCS by having a secure interface with their Application Servers. The messages can be stored in an encrypted manner in case home network doesn't want to share the encryption keys with LRCS, maintaining the end to end encryption between End-Device and Application server.

In an embodiment, LRCS further enables a centralized system for implementing rating policies among multiple LoRaWAN networks. LRCS can be used to select the preferred roaming partners. Subsequently, if the same message is received from multiple roaming partners, LRCS can forward only the message received from preferred roaming partner, while dropping the messages from other roaming partners. LRCS can be configured to support varied policies for Passive Roaming and Handover Roaming use cases depending upon pre-configured set of rules. Furthermore, LRCS can generate Network Activation Records, Network Traffic Records and Device Traffic Records for billing and analysis.

In an embodiment, LRCS can add additional routing information to the messages, if agreed upon by peer LoRaWAN networks. This additional routing information can be added as part of vendor-specific extensions or a new routing parameter that can be defined in accordance with LoRa alliance approval in future. This routing information can be utilized by other networks to verify that messages are delivered via a trusted routing agent positioned between Visited and Home Network nodes.

This invention can also detect message loops prior to forwarding the message to the destination network by verifying that Sender ID and Receiver IDs are different, as well as routing information received in input message is not matching its own identity.

When a LoRa End-Device attempts to perform roaming activation, the End-Device sends Join-Request message having JoinEUI, DevEUI, DevNonce objects to a visited network server. Based on JoinEUI object, Forwarding/Serving Network Server contacts LRCS or Home Join Server to retrieve Home Network ID. As part of this invention, the network IDs of all peer operators are resolved to LRCS IP address, such that all roaming traffic is routed via LRCS. When LRCS receives this traffic, LRCS identifies the Home network by resolving Receiver ID to the IP address of the Home Network Server. When Home Join server replies with Join Accept message towards the device, the LRCS reads the End-Device address and stores it along with Device EUI.

In an embodiment, LRCS maintains a database of whitelisted and black-listed networks or devices to protect the home network against malicious traffic. Based on this database and roaming agreements, LRCS can selectively block or route traffic toward Home Network Server of the LoRa device.

In an embodiment, LRCS functions as a LoRaWAN backend message routing/proxy agent between visited Network Server and home Network Server. LRCS also has the functionality to resolve Network IDs and Join Server IDs into their respective IP addresses based on a DNS mechanism.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

Figure 1:
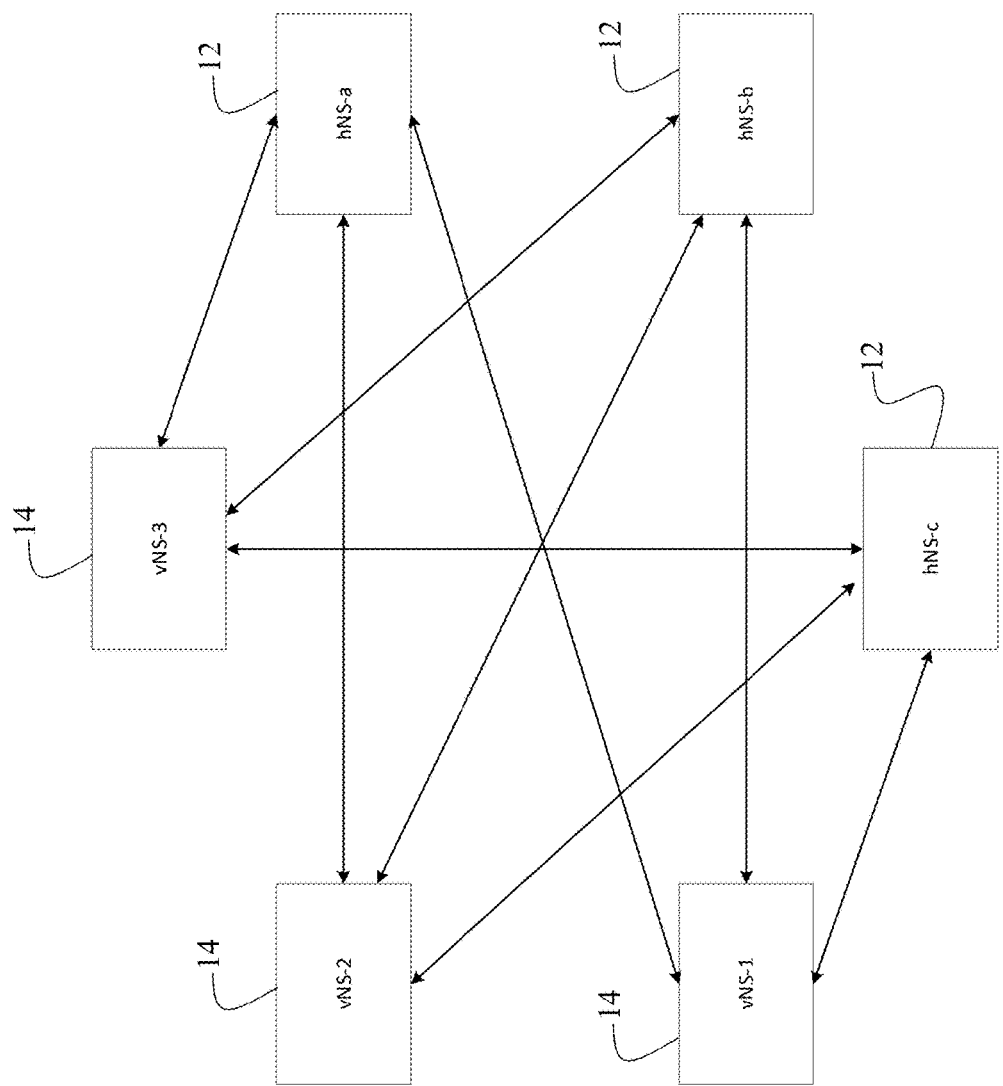
FIG. 1 is a diagram schematically depicting the current Mesh Network Topology used for exchanging LoRaWAN Roaming traffic.

FIG. 1 depicts mesh network topology of LoRaWAN roaming scheme described in LoRaWAN specification. According to this roaming scheme each individual home Network Server (hNS) 12 directly interconnects with each individual forwarding/serving Network Server (fNS/sNS), which in the roaming scenario is referred to as visited Network Server (vNS) 14. Such mesh network topology is cumbersome and difficult to implement. Lack of direct roaming agreements between the LoRaWAN network operators presents a major obstacle in implementation of LoRaWAN roaming.

Figure 2:
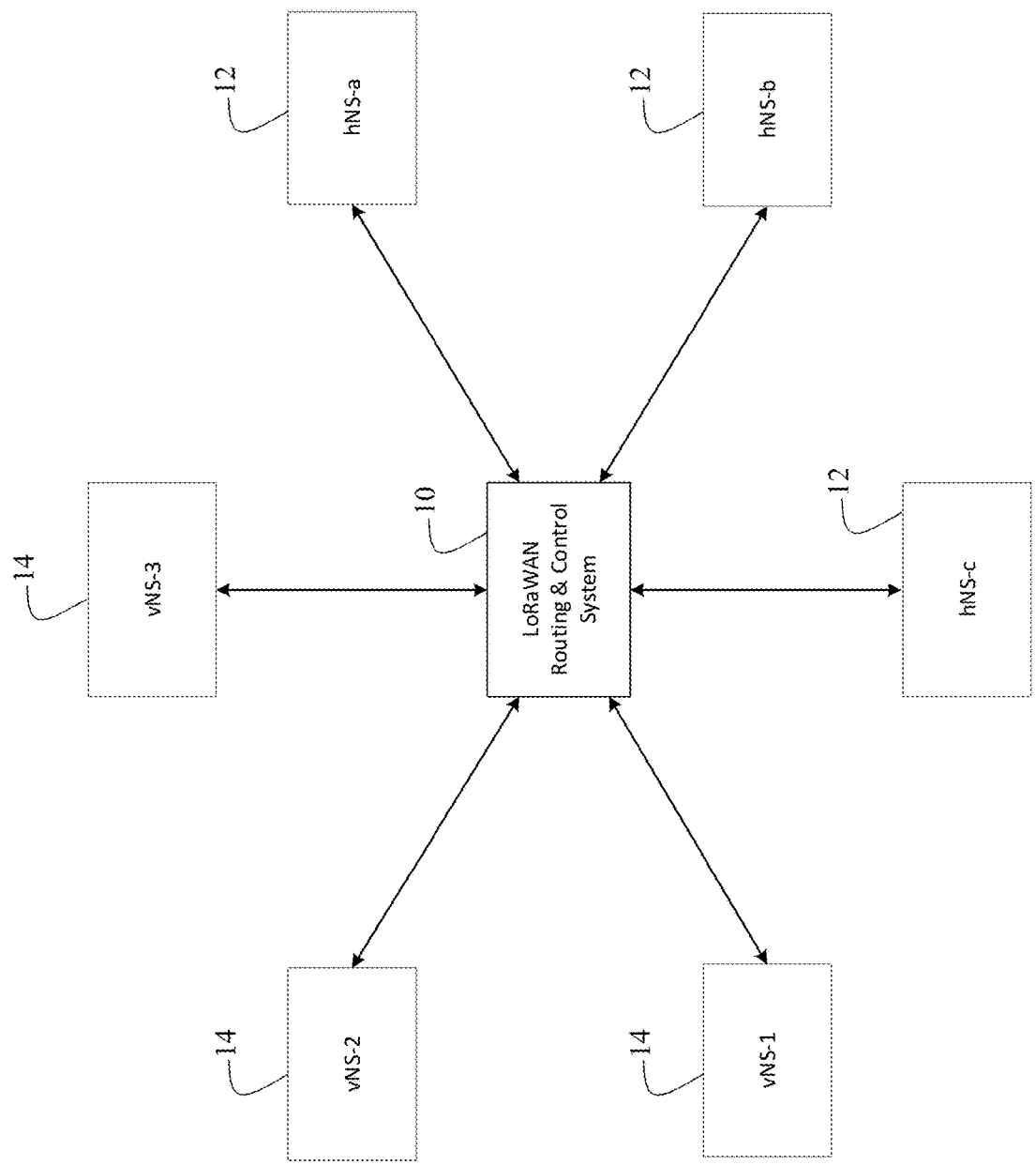
FIG. 2 is a diagram schematically depicting the topology of LoRaWAN Roaming via LRCS node.

In a sharp departure from the current state of the art, the disclosed invention provides a centralized cloud hosted node LoRaWAN Routing and Control System (LRCS) 10, as shown in exemplary network topology depicted in FIG. 2. LRCS 10 obviates the need for each hNS 12 to establish a direct connection with every vNS 14. Instead, every hNS 12 and vNS 14 establishes a direct connection only with LRCS 10. Because all participating networks have a common connection to LRCS 10, the overall network topology is optimized and significantly simplified.

In an embodiment, LRCS 10 is configured to enable roaming by providing secure packet routing to bridge LoRaWAN hNSs 12 and vNSs 14. LRCS 10 can manage roaming agreements and share network information globally to achieve quick traffic routing between multiple hNS 12 and vNS 14 belonging to different LoRaWAN operators. LRCS 10 supports both Passive and Handover Roaming use cases.

Figure 3:
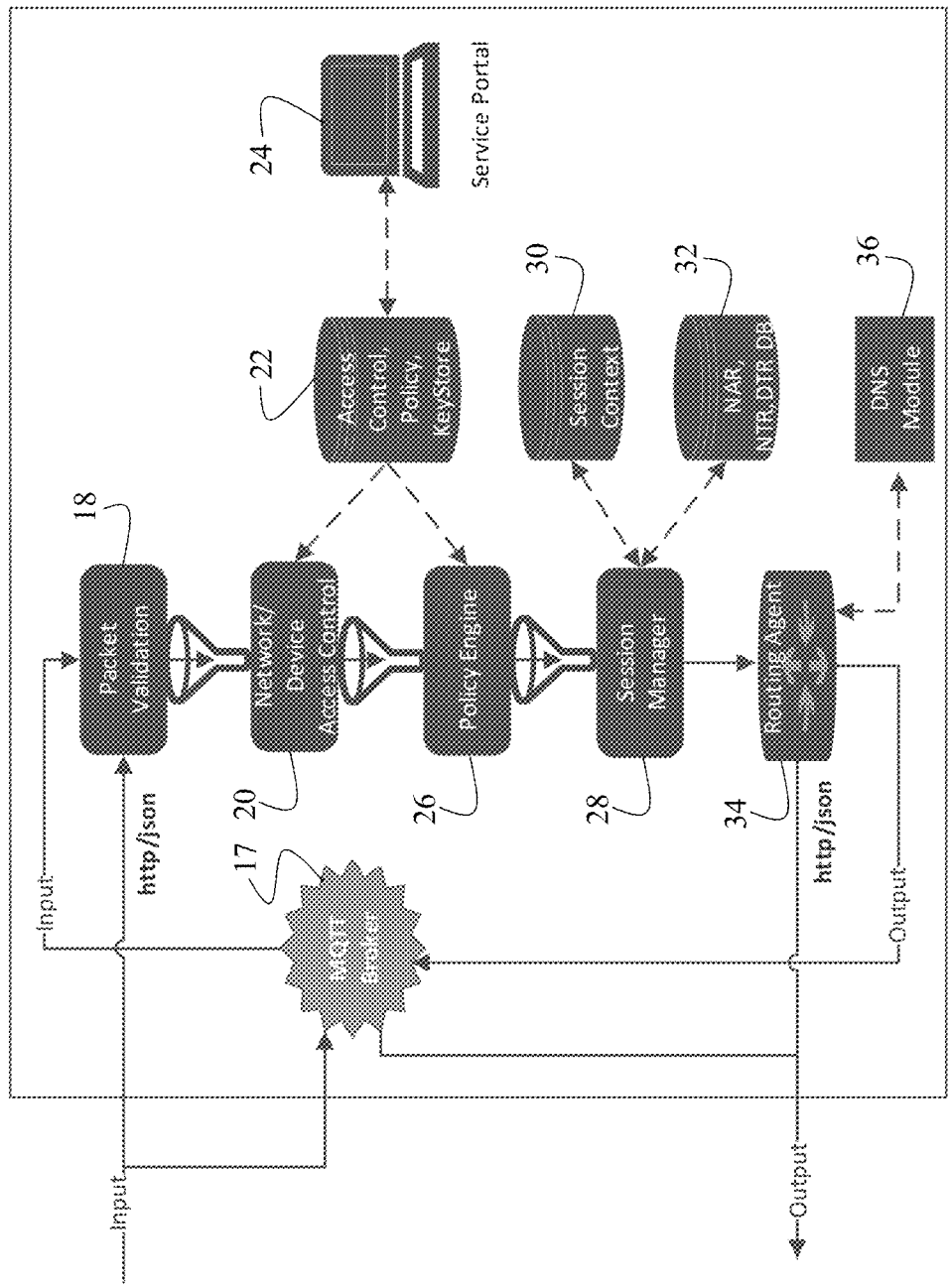
FIG. 3 is a diagram schematically depicting the internal components of LRCS node.

An exemplary architecture of LRCS 10 is depicted in FIG. 3. LRCS 10 can include a set of modules configured to inspect and process LoRaWAN signaling and payload messages. Specifically, FIG. 3 depicts that LRCS 10 can be configured to process multiple types of LoRaWAN messages. In an embodiment, LRCS 10 can be equipped with a Message Queuing Telemetry Transport (MQTT) Broker module 17. MQTT broker 17 may accept messages published by peer Network Servers (vNS 14 and hNS 12). In this embodiment, LRCS 10 can be configured to use a routing technique that submits the uplink and/or downlink messages to MQTT broker 17. The MQTT broker 17 publishes the uplink/downlink messages towards respective hNSs 12 based on subscribed Network IDs or Device EUIs. In this embodiment, LRCS 10 functions as a data aggregator for peer Application Servers (AS). LRCS 10 can further function as a central location, from which hNS 12 can receive all messages to which hNS 12 subscribes.

In addition to MQTT messages, LRCS 10 can be configured to receive and process Hypertext Transfer Protocol (HTTP) and JavaScript Object Notation (JSON) messages. As depicted in FIG. 3, MQTT messages pass through MQTT broker 17 first and, then, are routed to Packet Validation module 18, while HTTP and JSON messages are received directly by Packet Validation Module 18.

Packet Validation Module 18 can be configured to validate incoming messages. Validation Module 18 can be used to verify whether incoming packets are compliant to standard LoRaWAN backend specifications. Validation Module

18 can be also used to validate that there are no message loops, which can impact LoRaWAN network service. Validation Module 18 can detect message loops prior to forwarding the message to hNS 12. For example, message loops can be detected by verifying that a sender ID and a receiver ID are different, and that the routing information received in the input message does not match its own identity. In this manner, LRCS 10 can be configured to reject non-complaint signaling and payload messages.

Next, FIG. 3 depicts that LRCS 10 can further comprise a Network/Device Access Control Module 20. Access Control Module 20 can be used to filter input messages against a list of whitelisted and backlisted Network IDs and/or Device Extended User Identifications (EUIs). In this manner, LRCS 10 can function as a Firewall to protect backend nodes against blacklisted networks and/or End-Devices. (This feature is discussed in more detail with reference to FIG. 6.) To achieve this functionality Access Control Module queries Access Control Database 22 to verify that the Network ID and/or Device EUI have not been blacklisted. In an embodiment, an Administrator can update Access Control Database 22 using a Service Portal 24. Service Portal 24 can be used to configure and manage roaming agreements and policies based on Network IDs and Device EUIs of peer operators.

Access Control Module 20 can be configured to filter the incoming messages against a pre-configured list of preferred visited Network IDs. Access Control Module 20 inspects the messages to determine whether duplicate messages from same Device EUI are received from multiple visited networks within a pre-defined duration of time. In such scenario, Access Control Module 20 processes and forwards only the message belonging to the preferred visited network and rejects the duplicate messages from non-preferred visited networks.

FIG. 3 further depicts that LRCS 10 includes a Policy Engine 26. Policy Engine 26 may be implemented to verify that a roaming agreement exists between the vNS 14, identified by Sender ID of the received packet, and hNS 12, identified by Receiver ID of the received packet. Policy Engine 26 can also support additional policies, such as selecting messages from a Preferred Roaming Partner, fair device usage checks, and performing message integrity checks, depending upon an agreement with other networks. To accomplish this functionality, Policy Engine 26 is configured to query Access Control Database 22 to retrieve and verify relevant information.

LRCS 10 further includes a Session Manager module 28. Session Manager 28 is configured to store End-Device session contexts in Session Context Database 30. Session Manger 28 is configured to match request and responses and to provide session binding across peer Network Server nodes. In an embodiment of the invention, Session Manager 28 is used to maintain session-specific information including End-Device address, device EUI, uplink traffic bytes, downlink traffic bytes, device activation timestamp, visited network ID, home network ID, visited network IP address and home network IP address. This information can be used to generate Network Activation Records (NAR), Network Traffic Records (NTR), and Device Traffic Records (DTR), which can be used for billing and rating. The generated records can be stored in NAR/NTR/DTR Database 32.

Continuing reference to FIG. 3, LRCS 10 includes a Routing Agent 34. Routing Agent 34 manages and proxies traffic between vNS 14 and hNS 12. Routing Agent 34 can be configured to extract Sender ID and Receiver ID from the received packets. Routing Agent 34 can be also configured to perform load balancing based on pre-configured routing rules. A DNS module 36 may be used to resolve Network IDs to respective IP addresses for performing packet routing. Resolution can be done locally or by contacting predefined authoritative DNS server.

FIG. 3 depicts that Routing Agent 34 can be configured to handle MQTT and HTTP/JSON messages differently. For MQTT messages, Routing Agent 34 transmits them to MQTT Broker 17. For HTTP/JSON LoRaWAN messages, Routing Agent 34 routes them to the destination hNS 12. Collectively, modules 18-36 described above form a Message Processor 38.

Figure 4:
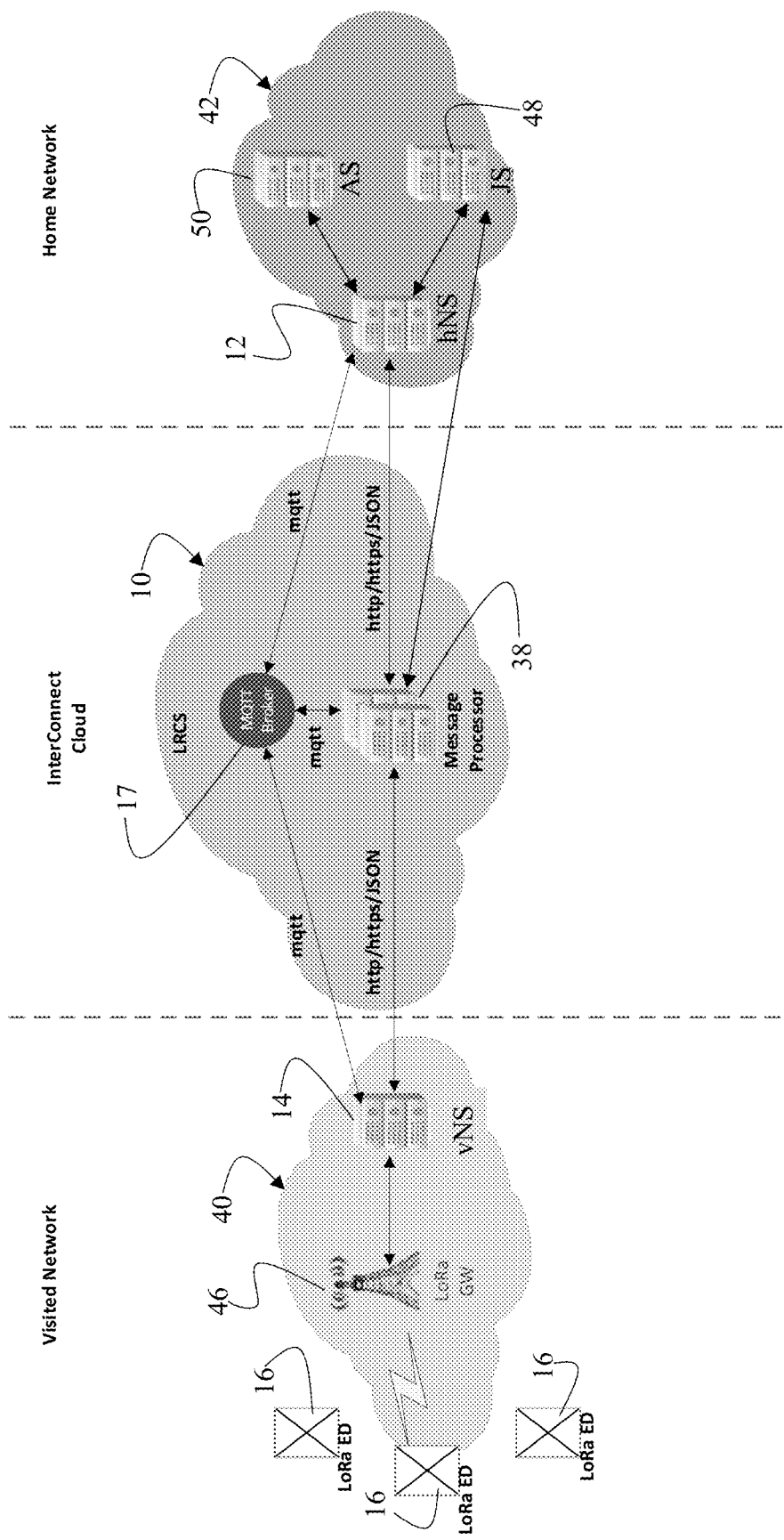
FIG. 4 is a diagram schematically depicting External interfaces of LRCS node.

FIG. 4 schematically depicts LRCS 10 being used to route LoRaWAN packets between a visited network 40 and a home network 42. FIG. 4 depicts that one or more LoRa End-Devices 16 are configured to send data packets to LoRa Gateway 46 operated by visited network 40. LoRa Gateway 46 routes the received LoRa packets to vNS 14, which is configured to establish communication links with LRCS 10. FIG. 4 depicts that MQTT Broker 17 of LRCS 10 can be used to receive and transmit MQTT packets. As discussed above, LRCS 10 includes a Message Processor 38, with which MQTT Broker 17 communicates to process the received MQTT messages. FIG. 4 further shows that HTTP/JSON messages are not routed to MQTT Broker 17 and, instead, are transmitted directly to Message Processor 38.

Message Processor 38 uses a set of modules (as described above) to verify that the incoming messages satisfy the predefined criteria. Message Processor 38 also identifies the IP address of the destination hNS 12. Upon successfully verifying that a MQTT message satisfies the predefined criteria, Message Processor 38 notifies MQTT Broker 17, which then transmits the messages to target hNS 12. With respect to HTTP/JSON messages, upon successfully verifying that a HTTP/JSON message satisfies the predefined criteria, Message Processor routes the message directly to target hNS 12.

FIG. 4 further depicts that hNS 12 has a direct relation with JS 48 and Application Server (AS) 50. HNS 12 stores Device Profile, Service Profile, Routing Profile and DevEUI of End-Device 16. JS 48 manages the Over-the-Air (OTA) activation process of End-Device 16. Multiple JSs 48 may be connected to hNS 12, and JS 48 may connect to multiple hNSs 12.

Figure 5:
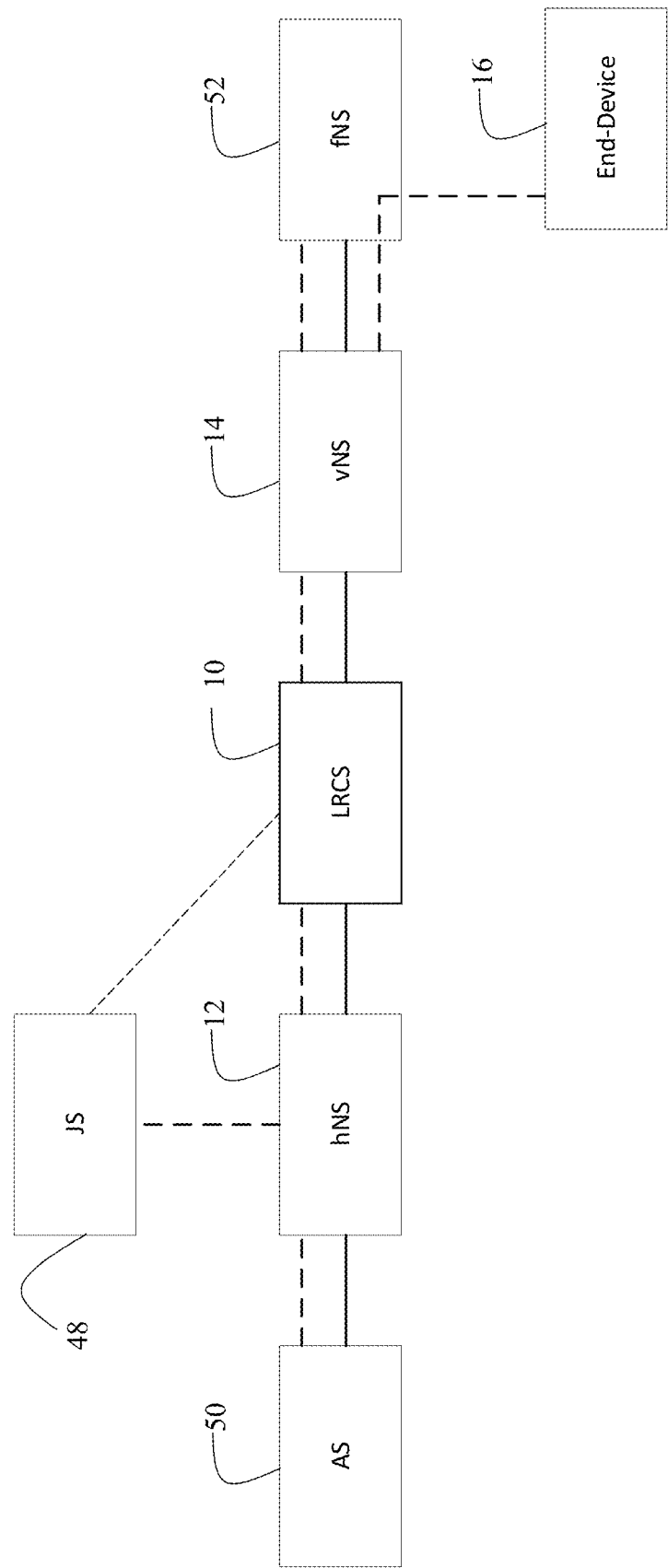
FIG. 5 is a diagram schematically depicting the positioning of LRCS node in a backend LoRaWAN Network.

FIG. 5 depicts network topology according to an embodiment of the invention. FIG. 5 depicts that LRCS 10 has a direct connection to JS 48. LRCS 10 communicates with JS 48 to retrieve an identifier of hNS 12 to which End-Device 16 belongs. JS 48 contains the required information to process uplink Join-Request frames and generate the downlink Join-Accept frames. JS 48 communicates the Network Session Key of End-Device 16 to LRCS 10. JS 48 can be configured to store the following information for each End-Device 16: DevEUI, AppKey, NwkKey, identifier of hNS 12, identifier of AS 50, listing of preferred networks, and/or LoRaWAN version of End-Device 16 (LoRaWAN 1.0, 1.0.2, or 1.1).

FIG. 5 further shows that, as discussed above, LRCS 10 is deployed between hNS 12 and vNS 14 and is configured to proxy uplink and downlink signaling and payload data messages therebetween. In an embodiment, LRCS 10 can be configured to function as a centralized Join Server and key-store to manage security keys on behalf of home networks connected thereto. Alternatively, LRCS 10 can be configured to function like a Join Server proxy to exchange packets between vNS 14 and JS 48.

To enable global roaming, LRCS 10 is configured to provide secure packet routing to bridge LoRaWAN networks. LRCS 10 can manage roaming agreements and share network information globally to achieve quick traffic routing between multiple network nodes belonging to different operators. LRCS 10 supports both Passive and Handover Roaming use cases. In an embodiment, LRCS 10 functions as a LoRaWAN backend message routing/proxy agent between vNS 14 and hNS 12. As discussed above with reference to FIG. 3, LRCS 10 has the functionality to resolve Network IDs and Join Server IDs into their respective IP addresses based on a DNS mechanism.

Because all uplink packets from vNS 14 to hNS 12 pass through LRCS 10, LRCS 10 can be configured to add routing information in the packets based on pre-configured policies. Keys may be deployed to enhance roaming mechanism such that hNS 12 could identify from the routing information the intermediate hop nodes used to deliver the packet. This information enables hNS 12 to validate that the packet was delivered via a trusted routing path. In an embodiment, LRCS 10 maintains fair usage policies and can be configured to discard packets from the End-Devices or networks that are not compliant.

FIG. 5 depicts that, optionally, the network topology may include one or more forwarding Network Servers (fNS) 52. In scenarios involving fNS 52, fNS 52 is configured to forward uplink and downlink packets between End-Device 16 and vNS 14. In this manner, one or more fNS 52 can be used to extend the network coverage.

Figure 6:
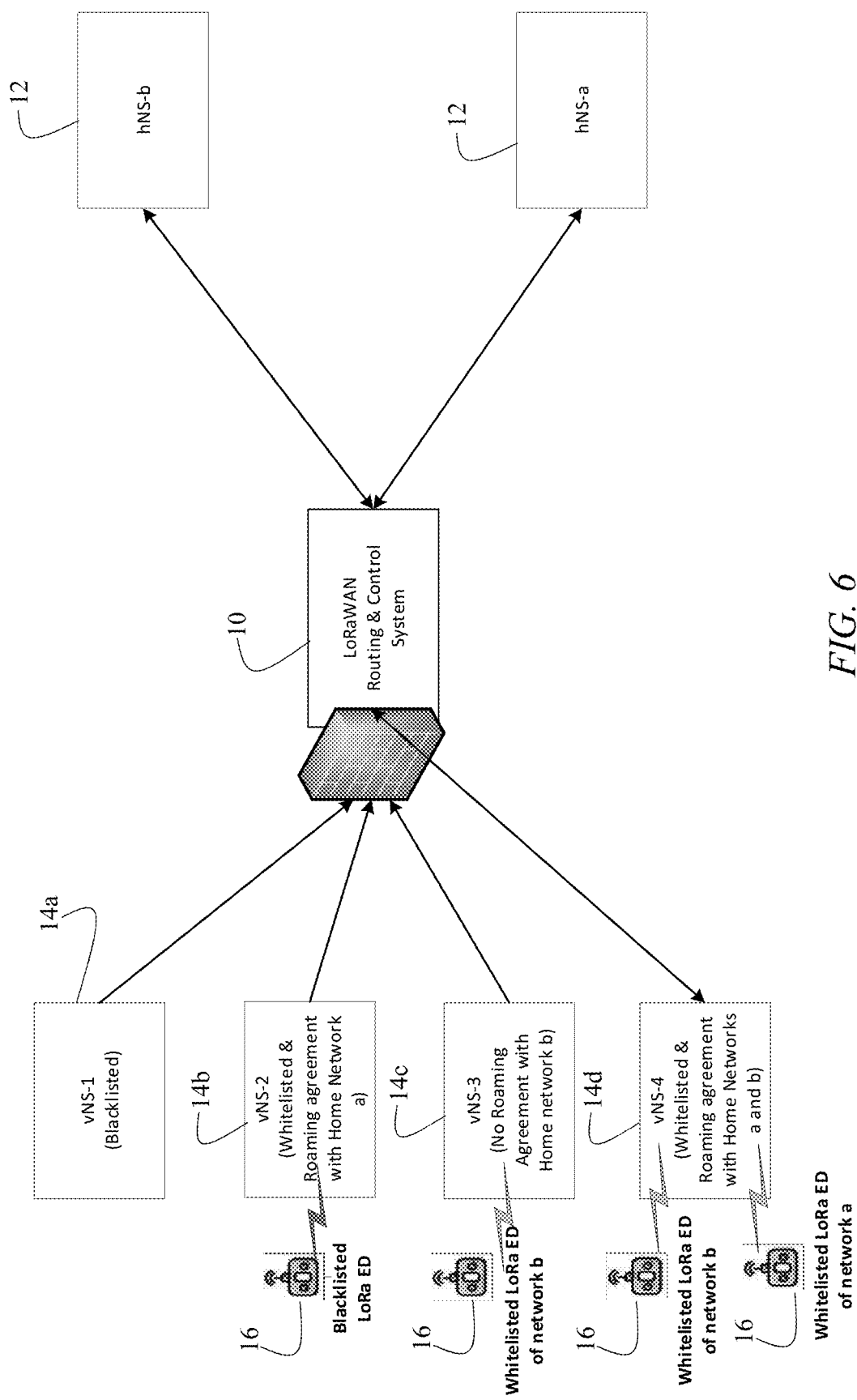
FIG. 6 is a diagram schematically depicting LRCS node acting as a LoRaWAN Firewall.

FIG. 6 schematically depicts the ability of LRCS 10 to function as a firewall shielding hNS 12 against malicious, unauthorized, or non-compliant packets. Because LRCS 10 is responsible for transmitting all packets between hNS 12 and vNS 14, LRCS 10 has an ability to inspect the packets to ensure that they satisfy the predefined criteria. LRCS 10 can be configured to reject packets that fail this verification process. LRCS 10 can maintain a database of white-listed and black-listed networks IDs and/or End-Device EUIs to protect hNS 12 against malicious traffic. Based on database and roaming agreements, LRCS 10 can selectively either block or route traffic towards hNS 12.

LRCS 10 can function as a centralized system for implementing rating policies among multiple LoRaWAN networks. LRCS 10 can give preference to preferred roaming partners. For example, if the same message is received from multiple vNSs 14, LRCS 10 will only forward the message from the vNS 14 belonging to a preferred roaming partner, while dropping the messages from non-roaming partners. LRCS 10 can support varied policies for Passive Roaming and Handover Roaming use cases depending upon pre-configured set of rules.

FIG. 6 depicts various scenarios in which LRCS 10 will reject incoming messages without forwarding them to hNS 12. Specifically, in the first scenario, vNS 14a is blacklisted, and LRCS 10 will block all traffic from vNS 14a. In the second scenario, if vNS 14b is whitelisted and has a roaming agreement with hNS 12, but End-Device 16 is blacklisted, LRCS 10 will block such traffic. Next, the third scenario involves a whitelisted End-Device 16 that is connected to vNS 14c that does not have a roaming agreement with hNS 12. In such scenario, LRCS 10 will also rejected incoming packets. Finally, the fourth scenario involves whitelisted End-Devices 16 connected to a whitelisted vNS 14d that has a roaming agreement with hNS 12. In this scenario, LRCS 10 will route the incoming packets to hNS 12.

Figure 7:
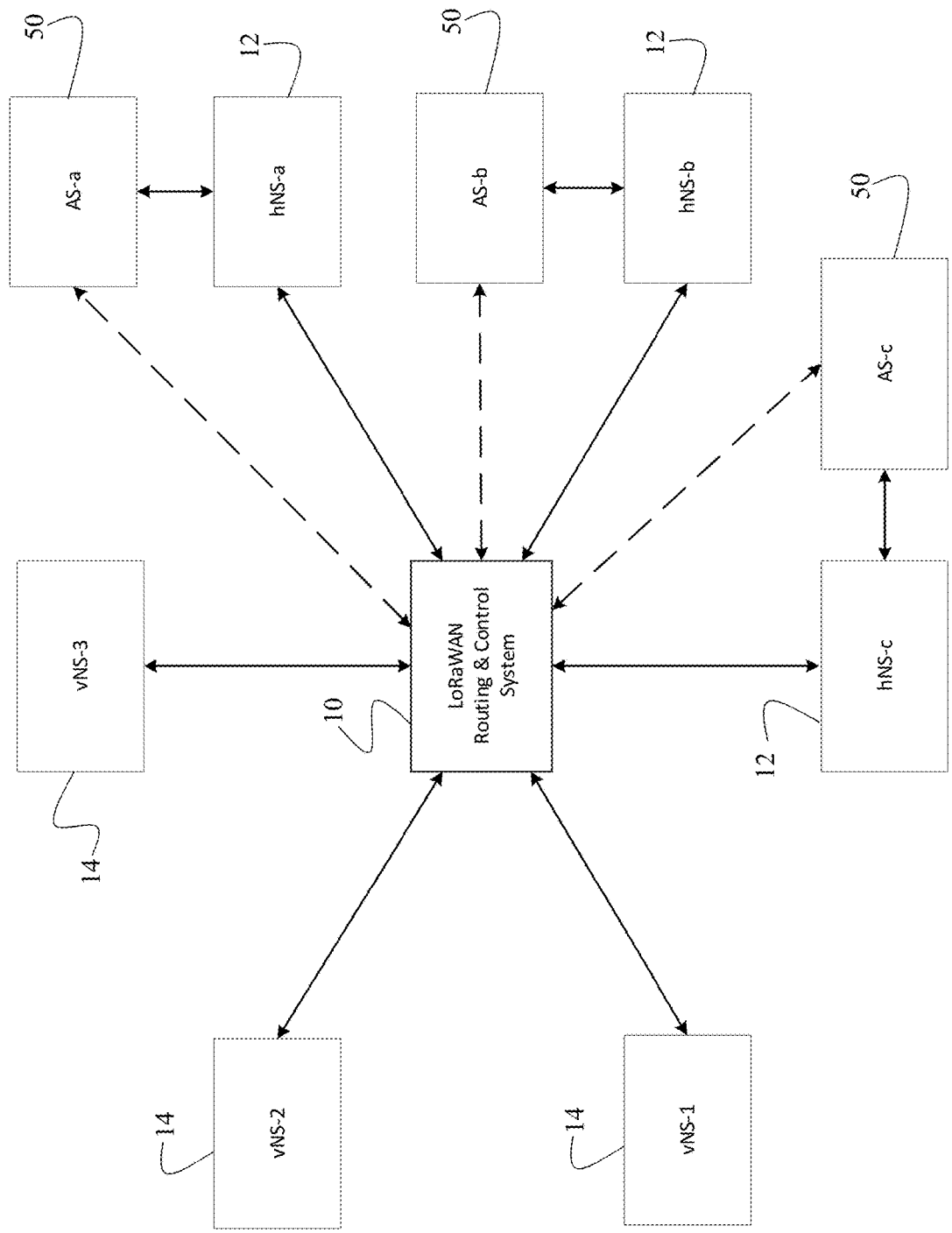
FIG. 7 is a diagram schematically depicting LRCS node acting as a LoRaWAN message aggregator.

FIG. 7 illustrates an ability of LRCS 10 to function as a LoRaWAN message aggregator. LRCS 10 functions as a centralized store, and multiple peer hNS 12 can retrieve application-level messages directly from LRCS 10 by having secure interface with their AS 50 to apply analytics. The Messages can be stored in an encrypted manner and end-to-end encryption between End-Device 16 and AS 50 can be maintained.

Figure 8:
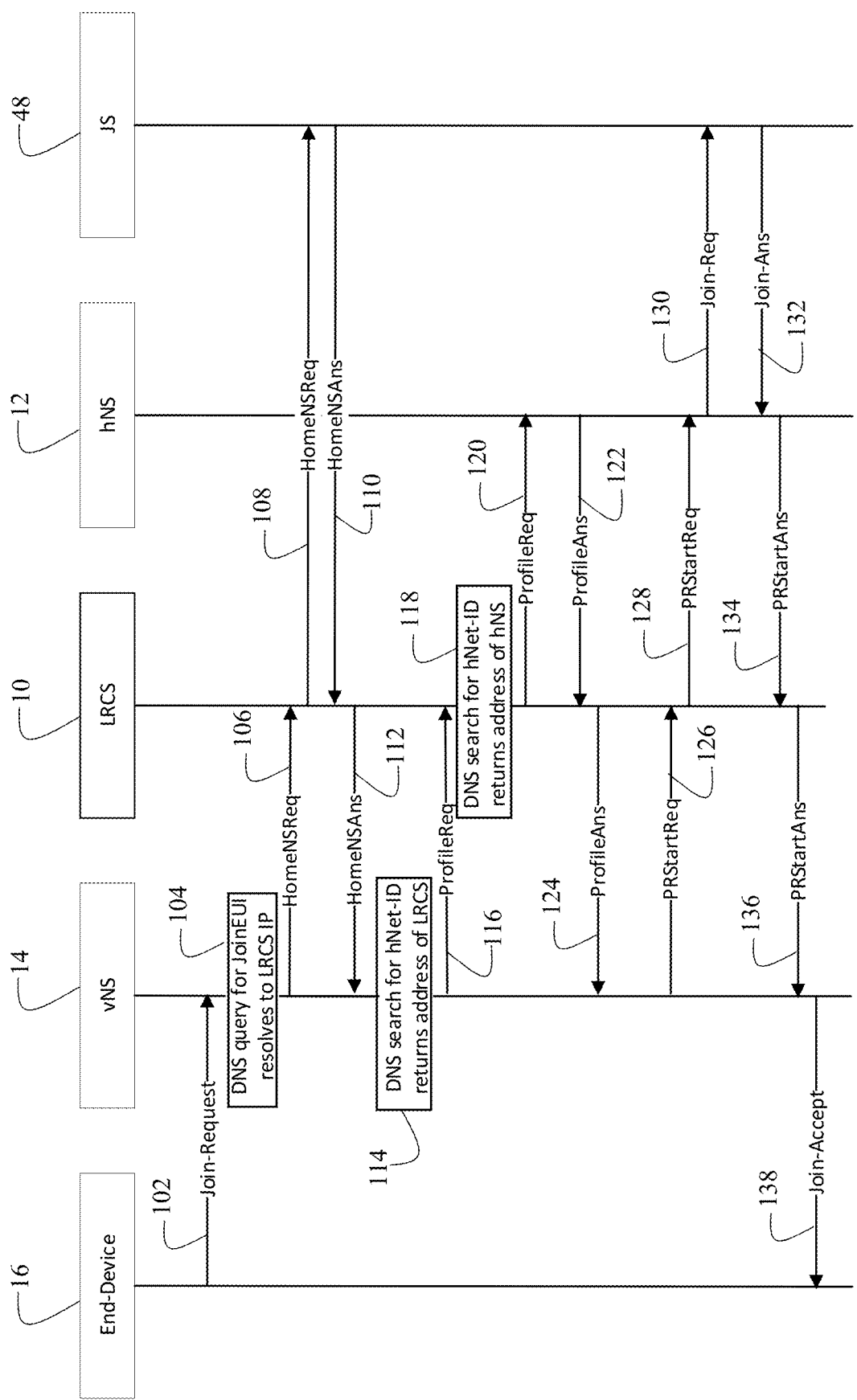
FIG. 8 is a diagram schematically depicting the call flow for Passive Roaming Activation via LRCS node.

FIGS. 8-16 depict signaling diagrams illustrating the call flows for various processes according to embodiments of the invention. FIG. 8 depicts a call flow for Passive Roaming activation. The process begins with step 102, in which End-Device 16 transmits a Join-Request message. In step 104, after receiving the Join-Request message, the vNS 14 determines whether it is a hNS 12 for End-Device 16 or whether End-Device 16 belongs to another NS and, therefore, is roaming in the coverage area of vNS 14. Responsive to determining that End-Device 16 is roaming, vNS 14 sends a DNS query to determine IP address of JS 48. In this invention, however, the DNS query is configured to return IP address of LRCS 10, instead of IP address of JS 48. Thus, in step 106, vNS 14 sends a Home-Network-Server-Request (HomeNSReq) message to the IP address of LRCS 10 (rather than JS 48).

Upon receipt of HomeNSReq message, LRCS 10 verifies that End-Device 16 is not blacklisted, and that End-Device 16 is authorized to roam with vNS 14. If the verification yields a negative result, LRCS 10 rejects the HomeNSReq message. Otherwise, if verification is successful, LRCS 10 determines the IP address of JS 48 associated with hNS 12 to which End-Device 16 belongs. In step 108, LRCS 10 sends the HomeNSReq message to JS 48. In step 110, JS 48 responds to LRCS 10 with a Home Network Server Answer (HomeNSAns) message. The HomeNSAns message includes a network identifier (NetID) that uniquely identifies hNS 12 to which End-Device 16 belongs. In step 112, LRCS 10 sends the HomeNSAns message to vNS 14.

In step 114, vNS 14 uses DNS to look up the IP address of hNS 12 based on the NetID provided in the HomeNSAns message. However, according to the method disclosed herein, the DNS server is pre-configured to return the IP address of LRCS 10, rather than the IP address of hNS 12, if the source address of query does not match LRCS 10 IP addresses. Thus, in step 116, vNS 14 sends a Profile-Request (ProfileReq) message to the IP address of LRCS 10, rather than hNS 12. In step 118, LRCS 10 performs its own local DNS query. To determine the IP address of hNS 12, the local DNS is pre-configured with IP addresses of all hNSs 12 of the partner home networks which are using its services; or authoritative DNS server is preconfigured to reply with actual IP addresses of hNS 12 when query comes from a source IP address of LRCS 10.

In step 120, LRCS 10 routes the ProfileReq message to the IP address of hNS 12. In step 120, hNS 12 responds to LRCS 10 with Profile-Answer (ProfileAns) message indicating that passive roaming is permitted. In step 124, LRCS 10 sends the ProfileAns message to vNS 14.

Because vNS 14 "thinks" that the IP address of LRCS 10 is the IP address of hNS 12, vNS 14 will send all subsequent messages to LRCS 10. LRCS 10 will verify that the messages satisfy the predefined criteria and policies provided by the home network. LRCS 10 sends the messages that successfully pass the verification procedure to hNS 12. Likewise, for downlink messages, LRCS 10 receives downlink messages from hNS 12 and then sends them to vNS 14.

According to the scheme described above, in step 126, vNS 14 sends Passive-Roaming-Start-Request (PRStartReq) message to LRCS 10. PRStartReq message carries the PHYPayload with Join-Request message ULMetadata. In step 128, LRCS 10 sends PRStartReq message to hNS 12. In step 130, hNS 12 sends a Join-Request (JoinReq) message to JS 48. The JoinReq message carries DevEUI, DevAddr, DLSettings, RxDelay, and optionally CFList defined by hNS 12. In step 132, JS 48 processes the JoinReq message and sends Join-Answer (JoinAns) message to hNS 12 carrying session keys (SNwkSIntKey, FNwkSIntKey, and NwkSEncKey in case of a R1.1, and NwkSKey in case of 6 a R1.0/1.0.2 End-Device). In step 134, hNS 12 sends a PRStartAns message to LRCS 10. In step 136, LRCS 10 routes the PRStartAns message to vNS 14. Finally, in step 138, vNS 14 sends a Join-Accept message to End-Device 16. The End-Device 16 generates network session keys upon receipt of the Join Accept message. LoRa End-Device 16 is now activated.

Figure 9:
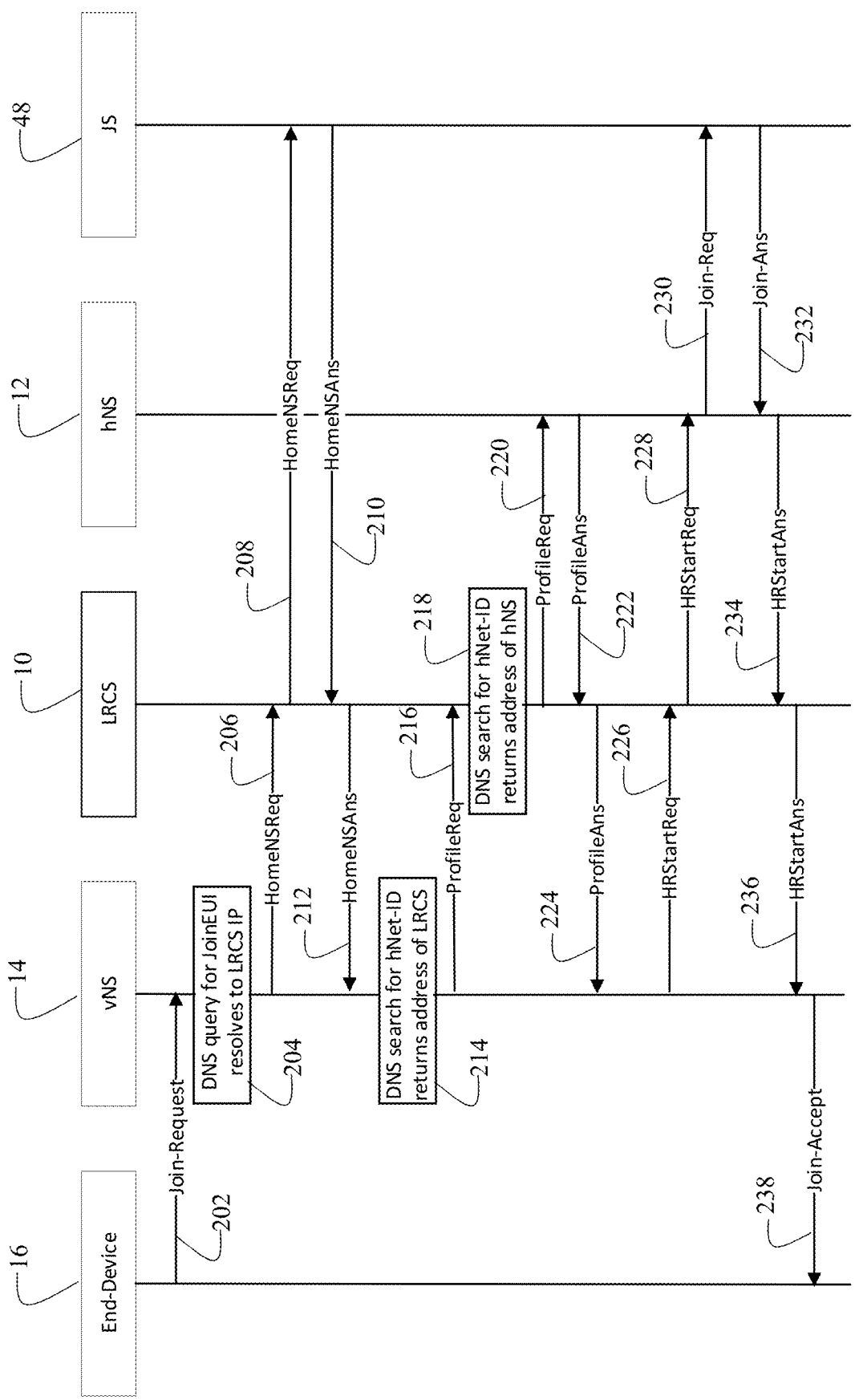
FIG. 9 is a diagram schematically depicting the call flow for Handover Roaming Activation via LRCS node.

FIG. 9 depicts the call flow for Handover Roaming activation using LRCS 10. Steps 202-224 are the same as those described above with respect to Passive Roaming activation. The invention provides that DNS queries from vNS 14 for JS 48 and hNS 12 are resolved to the IP address of LRCS 10. In this manner, vNS 14 transmits all messages to LRCS 10, which LRCS 10 inspects for compliance with roaming policies and other predefined criteria and routs them to their intended destinations—JS 48 or hNS 12.

The Handover Roaming activation procedure deviates from Passive Roaming activation procedure starting with step 226. In step 226, vNS 14 transmits a Handover-Roaming-Start-Request (HRStartReq) message carrying a Join-Request (JoinReq) to the IP address of LRCS 10. In step 228, LRCS 10 sends the HRStartReq message to hNS 12. In step 230, hNS 12 sends the JoinReq message received with the HRStartReq to JS 48. The JoinReq message carries MACVersion, DevEUI, DevAddr, DLSettings, RxDelay, and CFList values provided by vNS 14.

JS 48 processes the JoinReq message and, in step 232, responds to hNS 12 with a JoinAns message carrying network session keys. In step 234 hNS 12, sends the HRStartAns message to LRCS 10. HRStartAns message contains objects including the JoinAns message and Service Profile of End-Device 16. In step 236, LRCS 10 routes the HStartAns message to vNS 14. In step 238, vNS 14 sends a Join-Accept message to End-Device 16. Upon receipt of the Join-Accept message, End-Device 16 generates network session keys. At this point, LoRa End-Device 16 is activated.

Figure 10:
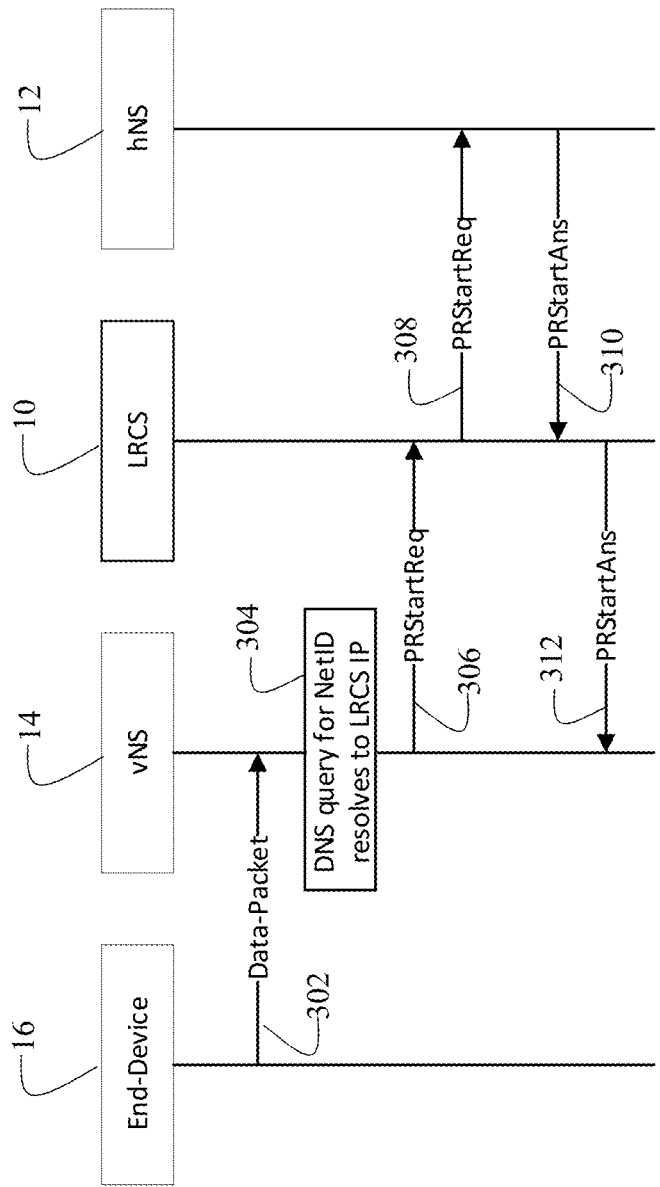
FIG. 10 is a diagram schematically depicting the call flow for Passive Roaming Start via LRCS node.
Figure 11:
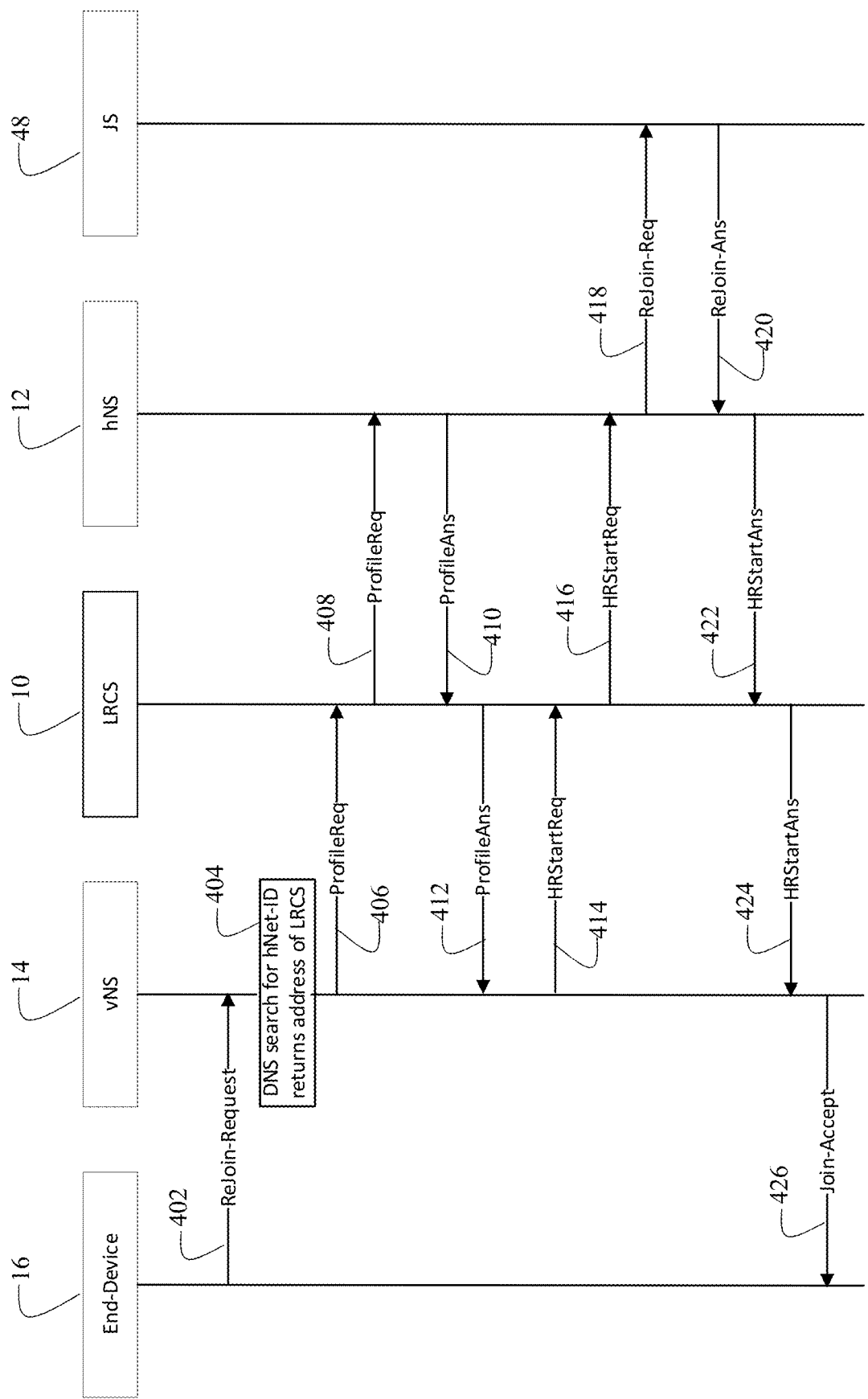
FIG. 11 is a diagram schematically depicting the call flow for Handover Roaming Start/Rejoin request via LRCS node.

Next, FIGS. 10 and 11 depict the call flows for start of roaming for an ongoing LoRa Session of End-Device 16. Specifically, FIG. 10 depicts the call flow for start of Passive Roaming for activated End-Device 16, and FIG. 11 depicts the call flow for start of Handover Roaming for activated End-Device 16.

Referring to FIG. 10, when End-Device 16 transmits a packet in step 302, the packet is received by vNS 14. Next, vNS 14 maps Network ID (NwkID) extracted from DevAddr in the received packet with the NetID of hNS 12 to which End-Device 16 belongs. In step 304, vNS 14 performs a DNS query using NetID of hNS 12. According to the invention, the query returns the IP address of LRCS 10, rather than hNS 12. Thus, in step 306, vNS 14 sends a PRStartReq message to LRCS 10. PRStartReq message carries the PHYPayload of the packet and the associated ULMetadata.

Next, LRCS 10 identifies the IP address of hNS 12 based on the NetID received in the PRStartReq message. In step 308, LRCS 10 forwards the PRStartReq message to hNS 12. In step 310, hNS 12 responds to LRCS 10 with PRStartAns message. In step 312, LRCS 10 forwards the PRStartAns to vNS 14. Subsequently, vNS 14 is configured to send packets received from End-Device 16 to hNS 12, and LRCS 10 notes vNS 14 as a candidate for sending downlink packets to End-Device 16.

FIG. 11 depicts the call flow for Handover Roaming start procedure for an already activated End-Device 16. In step 402, End-Device 16 transmits a Rejoin-Request message to vNS 14. In step 404, vNS 14 executes a DNS query to look up the IP address of hNS 12 based on the NetID in the received Rejoin-Request message. In this invention, DNS servers are configured to return the IP address of LRCS 10, rather than hNS 12 when DNS query is received from vNS 14. Accordingly, in step 406, vNS 14 sends ProfileReq message to LRCS 10. In step 408, LRCS 10 forwards the ProfileReq message to hNS 12. In step 410, hNS 12 responds to LRCS 10 with ProfileAns message. In step 412, LRCS 10 forwards the ProfileAns message to vNS 14.

In step 414, vNS 14 sends HRStartReq message to LRCS 10. In step 416, LRCS 10 forwards the HRStartReq message to hNS 12. In step 418, hNS 12 sends a Rejoin-Request message to JS 48. JS 48 processes the Rejoin-Request message and, in step 420, responds to hNS 12 with a Rejoin-Ans message. In step 422, hNS 12 sends HRStartAns message to LRCS 10, and, in step 424, LRCS 10 forwards the HRStartAns message to vNS 14. In step 426, vNS 14 sends a Join-Accept message to End-Device 16. At this point, vNS 14 is configured to transmit uplink packets from End-Device 16 to hNS 12.

Figure 12:
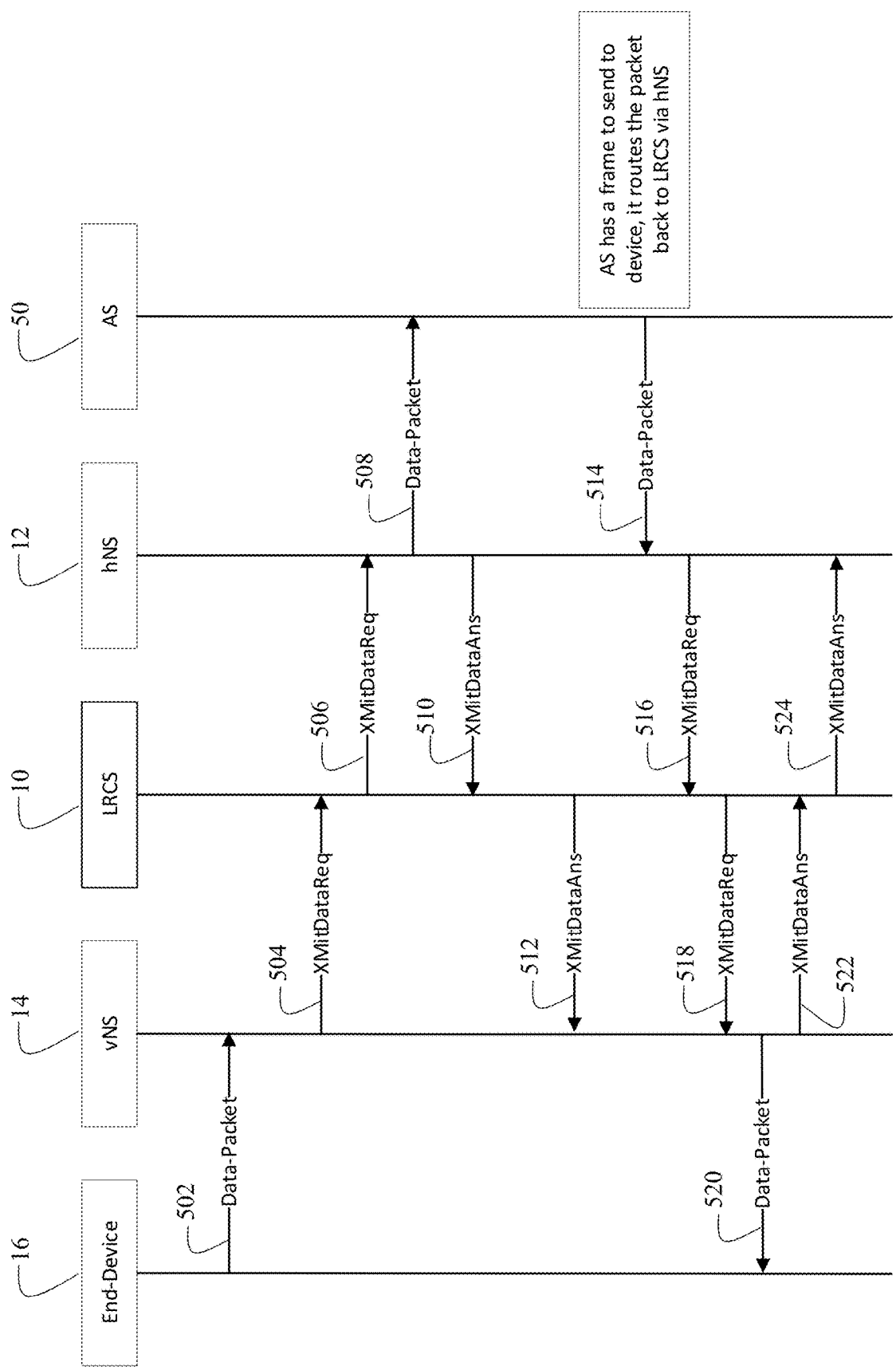
FIG. 12 is a diagram schematically depicting the call flow for Data exchange via LRCS node.

FIG. 12 depicts a call flow diagram for data exchange between End-Device 16 and AS 50. In step 502, End-Device 16 sends a data packet to vNS 14. In step 504, vNS 14 sends a XMitDataReq message to the IP address of LRCS 10. The XMitDataReq carries the PHYPayload of the received packet and the associated ULMetadata. In step 506, LRCS 10 forwards the XMitDataReq message to hNS 12. In step 508, hNS 12 sends the data packet to AS 50. In step 510, hNS 12 responds to LRCS 10 with XMitDataAns message indicating successful transmission of the data packet. In step 512, LRCS 10 forwards the XMitDataAns message to vNS 14. This is the process for transmitting uplink packets from End-Device 16 to AS 50.

When AS 50 has a downlink packet to transmit to End-Device 16, AS 50 routes the packet to LRCS 10 via hNS 12. Specifically, in step 514, AS 50 transmits the data packet to hNS 12, and, in step 516, hNS 12 sends a XMitDataReq message to LRCS 10. In step 518, LRCS 10 forwards the XMitDataReq to vNS 14. In step 520, vNS 14 sends the data packet to End-Device 16. In step 522, vNS 14 responds to LRCS 10 with a XMitDataAns message, confirming receipt of the data packet. In step 524, LRCS 10 forwards the XMitDataAns message to hNS 12. In this manner downlink packets are transmitted from AS 50 to End-Device 16.

Figure 13:
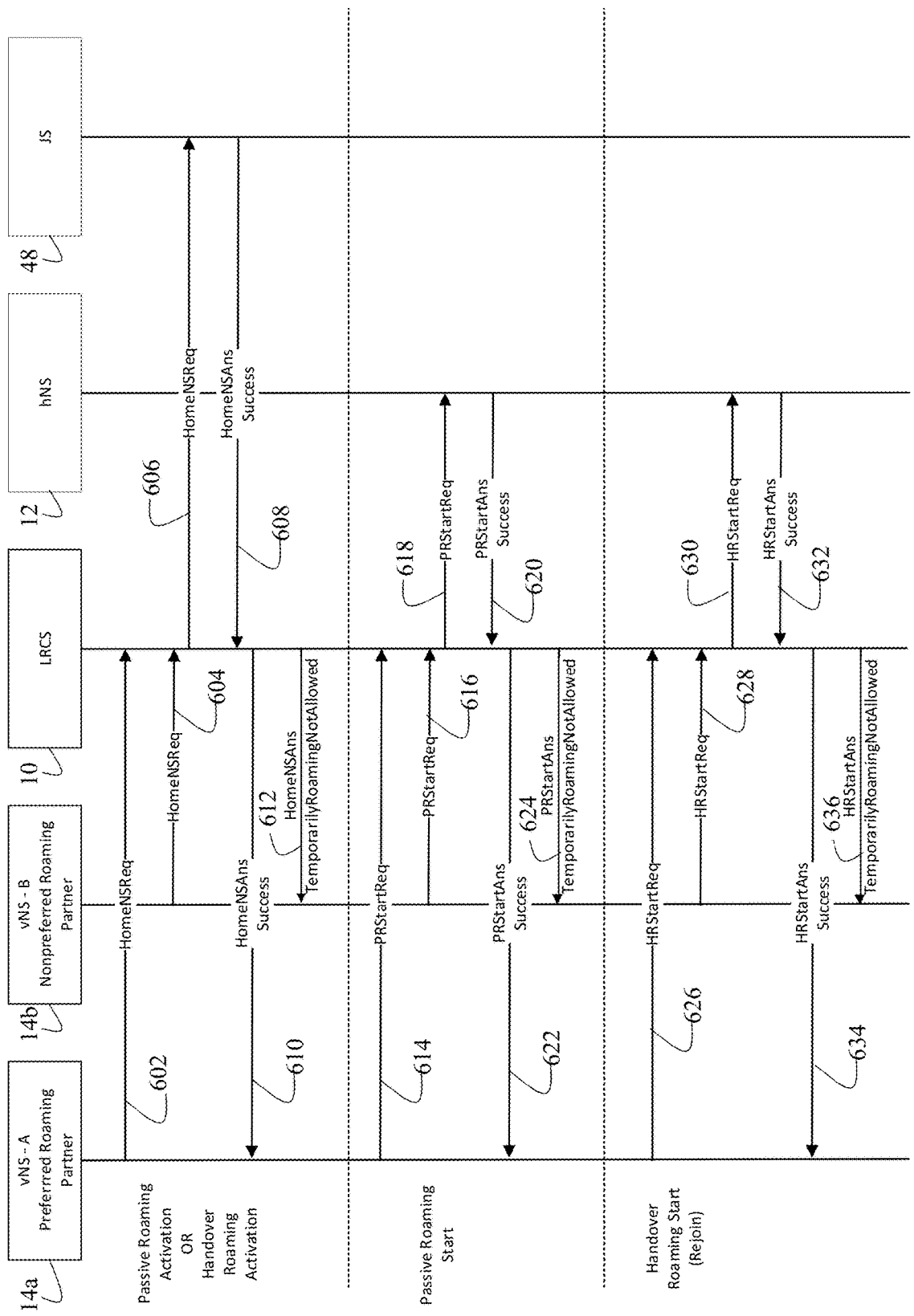
FIG. 13 is a diagram schematically depicting the call flow for managing various Preferred Roaming Partner messages against Non-Preferred Roaming Partner via LRCS node.

FIG. 13 illustrates the ability of LRCS 10 to steer End-Device 16 toward a preferred visited network at the activation stage and at the roaming start stage. During the activation procedure—for either Passive Roaming or Handover Roaming—multiple vNSs 14 may receive the message from End-Device 16. In the example of FIG. 13, vNS 14*a* and vNS 14*b* both receive a message from End-Device 16. However, vNS 14*a* is a preferred roaming partner, while vNS 14*b* is a non-preferred roaming partner. In steps 602 and 604, both vNS 14*a* and vNS 14*b* send HomeNSReq messages to the IP address of LRCS 10. LRCS 10 checks the multiple received messages to identify whether at least one of those messages originated from a preferred vNS 14*a*. Responsive to identifying that vNS 14*a* is a preferred network, LRCS 10 forwards the HomeNSReq message received from vNS 14*a* to JS 48. In step 608, JS 48 responds to LRCS 10 with HomeNSAns message. In step 610, LRCS 10 forwards the HomeNSAns message to vNS 14*a* to activate roaming. With respect to non-preferred vNS 14*b*, in step 612, LRCS 10 sends HomeNSAns message indicating that roaming is temporarily not allowed.

LRCS 10 applies analogous logic during roaming start procedures. For Passive Roaming start procedure, LRCS 10 receives PRStartReq messages from preferred vNS 14*a* and non-preferred vNS 14*b* in steps 614 and 616. LRCS 10 determines that vNS 14*a* belongs to the preferred roaming partner and, in step 618, forwards the PRStartReq message from vNS 14*a* to hNS 12. In step 620, hNS 12 responds to LRCS 10 with a PRStartAns message indicating successful roaming. In step 622, LRCS 10 forwards this PRStartAns to preferred vNS 14*a*. With respect to non-referred vNS 14*b*, in step 624, LRCS 10 responds with a PRStartAns indicating that roaming is temporarily not allowed.

With respect to Handover Roaming start procedure, LRCS 10 receives HRStartReq messages from preferred vNS 14*a* and non-preferred vNS 14*b* in steps 626 and 628 respectively. LRCS 10 determines that vNS 14*a* belongs to the preferred roaming partner and, in step 630, forwards the HRStartReq message from vNS 14*a* to hNS 12. In step 632, hNS 12 responds to LRCS 10 with a HRStartAns message indicating successful roaming. In step 634, LRCS 10 forwards this HRStartAns to preferred vNS 14*a*. With respect to non-referred vNS 14*b*, in step 636, LRCS 10 responds with a HRStartAns indicating that roaming is temporarily not allowed.

Figure 14:
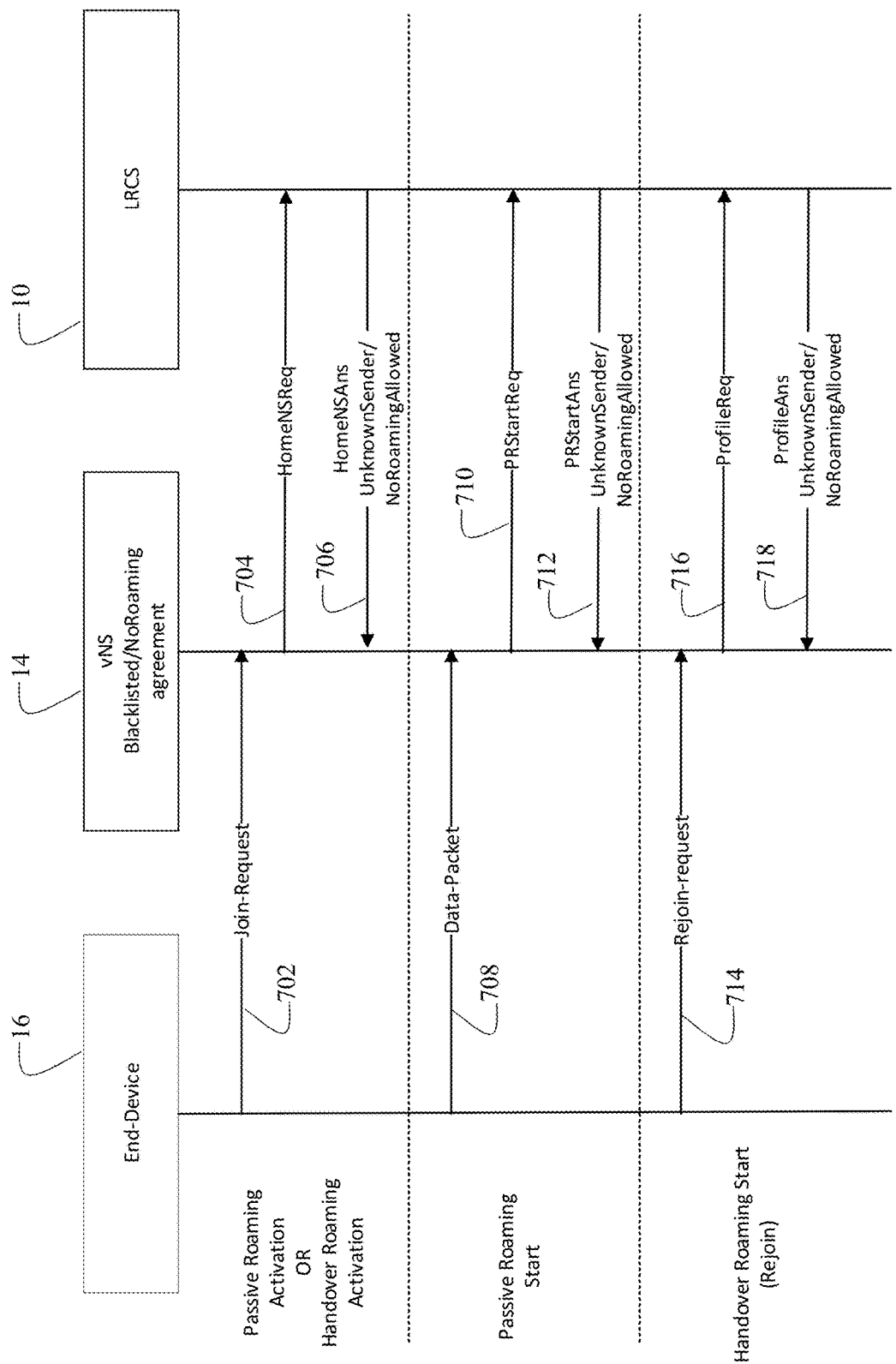
FIG. 14 is a diagram schematically depicting the call flow for rejecting various messages received from Blacklisted or Non-Roaming Partner Network Server node via LRCS node.

FIG. 14 illustrates the ability of LRCS 10 to block messages from vNS 14 that is blacklisted or belongs to a non-roaming partner. In step 702, End-Device 16 transmits a Join-Request message to vNS 14. In step 704, vNS 14 sends a HomeNSReq message to LRCS 10. Responsive to identifying that vNS 14 is either blacklisted or does not have a roaming agreement with hNS 12, in step 706, LRCS 10 responds to vNS 14 with a HomeNSAns message indicating that roaming is not allowed (NoRoamingAllowed).

Similarly, during Passive Roaming start procedure End-Device 16 transmits a data packet in step 708. This data packet is received by vNS 14. In step 710, vNS 14 sends PRStartAns message to the IP address of LRCS 10. Responsive to identifying that vNS 14 is either blacklisted or does not have a roaming agreement with hNS 12, LRCS 10 responds, in step 712, to vNS 14*b* with a PRStartAns message indicating that roaming is not allowed (NoRoamingAllowed).

For Handover Roaming start procedure, the process begins with End-Device 16 sending a Rejoin-Request in step 714. In step 716, vNS 14 sends a ProfileReq message to LRCS 10. In step 718, responsive to identifying that vNS 14 is either blacklisted or does not have a roaming agreement with hNS 12, LRCS 10 responds to vNS 14 with a ProfileAns message indicating that roaming is not allowed (NoRoamingAllowed).

Figure 15:
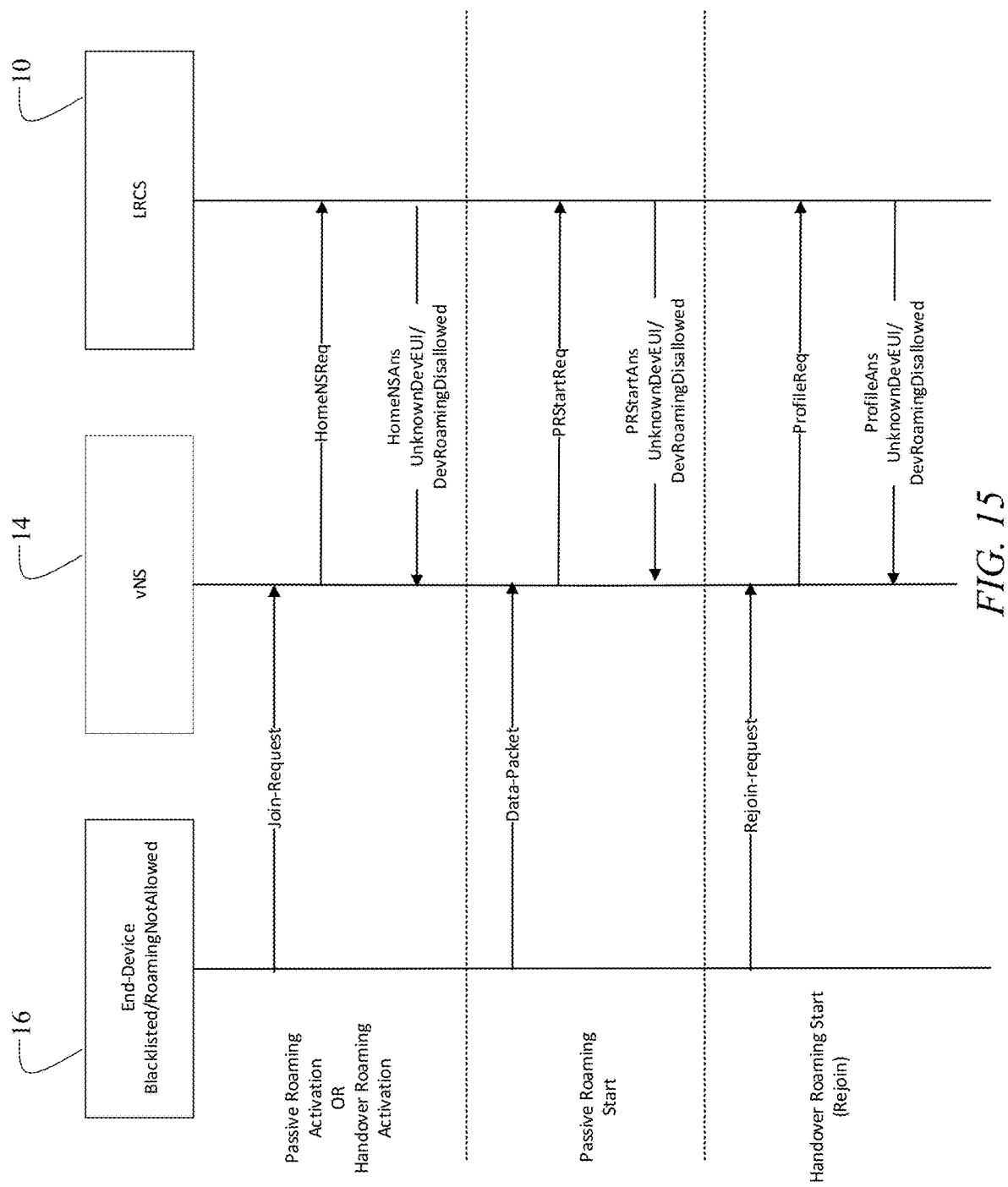
FIG. 15 is a diagram schematically depicting the call flow for rejecting various messages originated from Blacklisted or Non-Roaming-Profile End-Device via LRCS node.

FIG. 15 depicts similar rejection procedures to those described with respect to FIG. 14, except in FIG. 15 the issue lies with End-Device 16, rather than vNS 14. If LRCS 10 determines that End-Device 16 is either blacklisted or not allowed to roam, LRCS 10 will respond to HomeNSReq, PRStartReq, and ProfileReq messages from vNS 14 with answer messages indicating that device roaming is disallowed (DevRoamingDisallowed).

Figure 16:
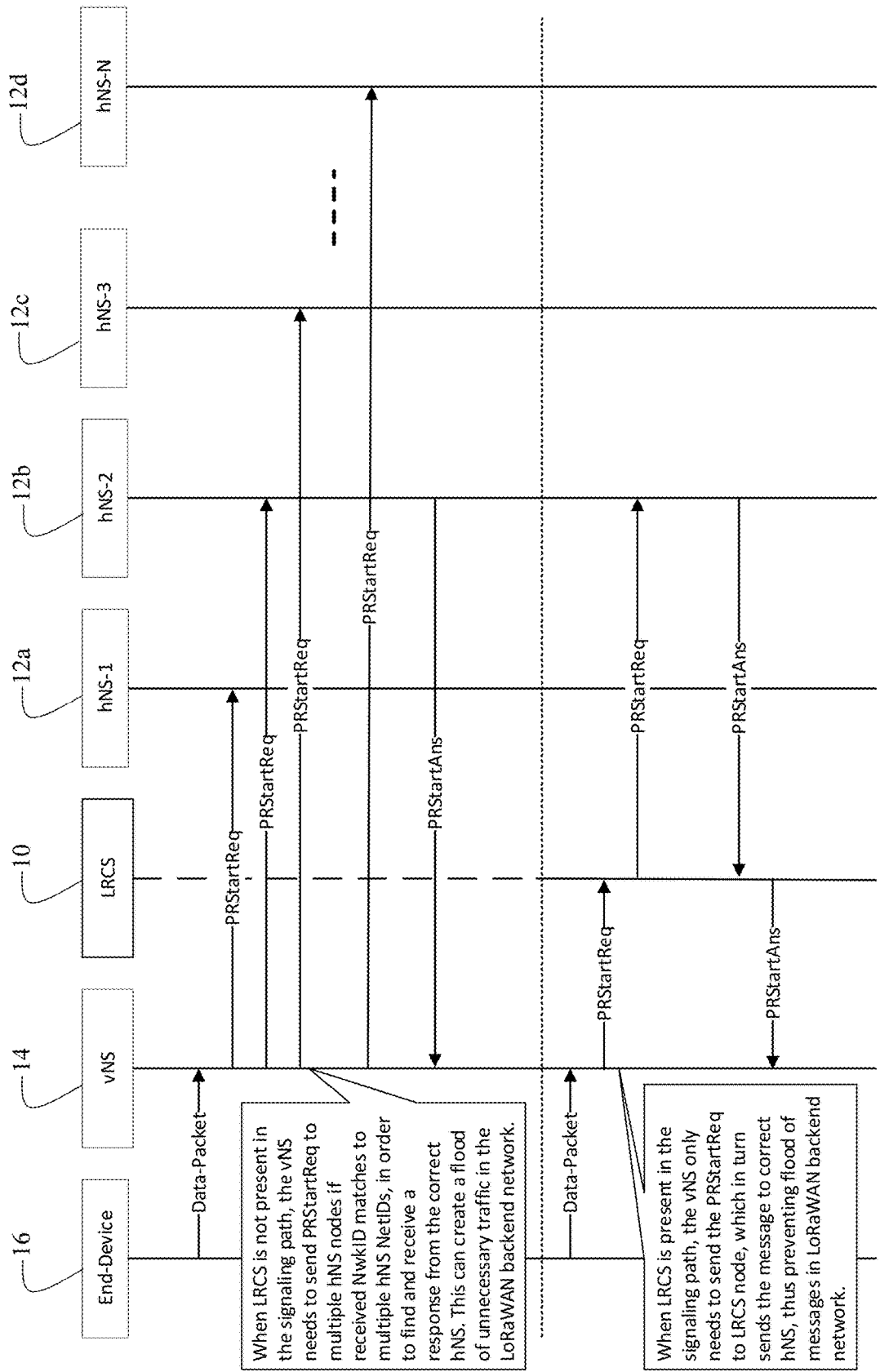
FIG. 16 is a diagram schematically depicting the call flow for preventing duplicate messages being transmitted from a visited Network Server to multiple home Network Servers.

FIG. 16 comprises of a top portion depicting LoRaWAN Roaming according to the current state of the art and a bottom portion depicting improvements to LoRaWAN Roaming enabled by the present invention. Presently, there exists a scenario in backend LoRaWAN network in which vNS 14 may need to trigger PRStartReq message towards multiple hNS 12 (12*a-d*), in case the NwkID in the received packet as part of DevAddr, maps with the multiple NetIDs of one or more operators, with whom vNS 14 has a passive roaming agreement. This scheme creates a flood of unnecessary traffic in the LoRaWAN backend network.

In sharp contrast, the bottom portion of FIG. 16 depicts that deployment of LRCS 10 enables vNS 14 to send a single PRStartReq message to LRCS 10, rather than sending multiple messages to multiple hNS 12. LRCS 10 handles the task of identifying the correct hNS 12 associated with End-Device 16. As depicted in FIG. 16, vNS 14 sends a single PRStartReq message to LRCS 10, which then based on its internal session database of DevAddr, Home NetID, Frame Counter, F/SNwkIntkey and Device EUI can figure out the exact matching hNS 12 to deliver the message. Responsive to identifying the correct hNS 12, LRCS 10 forwards the PRStartReq message only to that hNS 12, thereby preventing a flood of messages in LoRaWAN backend network.

Glossary of Claim Terms

DevAddr is an End-Device identifier assigned by the LoRaWAN network, which is composed of a) Type Prefix: Variable length MSB that indicates the NetID Type of the assigning network, b) NwkID: Variable length bits that follow the Type Prefix field. They are used for identifying the network. The value of NwkID is set to the predefined number of LSB of 12 ID field of the NetID, and c) NwkAddr: Variable length LSB that is assigned to the End-Device by the network.

DevEUI (Extended Unique Identifier) is a related standard to the media access control address (MAC address) of an End-Device, assigned by the manufacturer, or the owner, of the End-Device. EUIs are managed by the Institute of Electrical and Electronics Engineers (IEEE). With some exceptions, each EUI is intended to be globally unique and bound to a hardware device instance or other object that requires unique identification.

DNS (Domain Name System) translates domain names to the numerical IP addresses required for locating and identifying computer services and devices with the underlying network protocols.

Home Network means the network to which the LoRa device is registered with.

IoT (Internet of Things) typically includes "smart devices" that are connected to the Internet such as sensors, home automation devices, lighting fixtures and security systems.

JoinEUI is a global application ID in the IEEE EUI64 address space identifying the join server during the over the air activation. For non-private networks JoinEUI corresponds to a subdomain of joineuis.lora-alliance.org. This server name is used to find the IP address of the join server via DNS.

LoopedPacket: If, based on SenderID, ReceiverID and Routing information, the LRCS discovers that forwarding a packet would result in creation of a loop across the network, then the LRCS drops such packet to safeguard the network and replies back to the source IP address from which the packet was received with the cause "LoopedPacket".

LoRa is a long range, low power wide area network protocol.

LoRaWAN defines a communication protocol and system architecture for a LoRa-based network.

LRCS (LoRaWAN Routing and Control System) references one or more embodiments of the current invention that enable (among other features) global roaming of LoRa devices by routing and controlling backend LoRaWAN traffic among network nodes of multiple public or private networks by use of a centralized system.

MQTT (Message Queuing Telemetry Transport) is a publish-subscribe-based messaging protocol defined by ISO standard (ISO/IEC PRF 20922).

NoResourcesAvailable: This is a generic cause which would be returned back to the requesting entity in case serving entity is unreachable from the LRCS or resources are not available within the system to serve a request at that point in time.

Network ID (or NetID) is a 24-bit value used for identifying LoRaWAN networks. It is assigned by the LoRa Alliance. This value is used by networks for assigning network-specific addresses to their End-Devices (i.e., DevAddr) so that uplink frames sent by those devices, even when they are roaming outside their home network, can be forwarded to their home network.

OverlappingRequest: If the LRCS receives duplicate messages from multiple vNSs belonging to different roaming partners, after a predefined period of time has elapsed, then the LRCS rejects such duplicate requests with cause "OverlappingRequest"; or if the LRCS is configured to reject duplicate messages received at the same time from two different preferred roaming partners within predefined period of time, then the request that is received later is rejected with this cause.

Preferred network means roaming networks, particularly "roaming partners" with whom the home network has a quality-assured and cost-effective roaming agreement, rather than using non-affiliated roaming network.

Roaming refers to a LoRa End-Device being used outside the range of its home network and connects to another available partner network.

Visited Network means the network on which a LoRa End-Device roams temporarily and is outside the "Home Network".

TemporarilyRoamingActDisallowed: If the LRCS receives duplicate messages from two vNSs belonging to two different roaming partners for activation of an End-Device, and LRCS discovers that one of the roaming partners is preferred over the other, then the LRCS rejects the request from non-preferred roaming partner with the cause "TemporarilyRoamingActDisallowed".

TemporarilyRoamingDisallowed: If the LRCS receives duplicate messages from two vNSs belonging to two different roaming partners, and the LRCS discovers that one of the roaming partners is preferred over the other, then the LRCS rejects the request from non-preferred roaming partner with the cause "TemporarilyRoamingDisallowed".

Software and Hardware Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of providing Long Range Wide Area Network (LoRaWAN) roaming between a home network and an End-Device roaming in a visited network, comprising:
deploying a LoRaWAN Routing and Control System (LRCS) node, wherein the LRCS node is configured to interface with a visited Network Server and a home Network Server and is configured to route signaling and payload data messages therebetween, wherein the visited Network Server is configured to send the signaling and the payload data messages to an Internet Protocol (IP) address of the LRCS node;
receiving, by the LRCS node, a home-network-server-request message sent by the visited Network Server;
identifying, by the LRCS node, an IP address of a Join Server by executing a first Domain Name System (DNS) query based on a first set of data carried in the home-network-server-request message;
sending, by the LRCS node, the home-network-server-request message to the IP address of the Join Server;
receiving, by the LRCS node, a response message from the Join Server indicating that the End-Device is authorized to roam in the visited network and forwarding the response message to the visited Network Server;
receiving, by the LRCS node, a profile-request message from the visited Network Server;
identifying, by the LRCS node, an IP address of the home Network Server by executing a second DNS query based on a second set of data carried in the profile-request message;
sending, by the LRCS node, the profile-request message to the home Network Server and receiving, by the LRCS node, a profile-answer message from the home Network Server during an over-the-air roaming activation procedure; and
proxying, by the LRCS node, subsequent signaling and payload data messages between the visited Network Server and the Home Network Server, wherein the visited Network Server and the home Network Server transmit the subsequent signaling and payload data messages via the IP address of the LRCS node.

2. The method of claim 1, wherein the signaling and payload data messages are validated for compliance to LoRaWAN specifications, wherein the subsequent signaling and payload data messages not compliant to the LoRaWAN specifications are rejected or discarded.

3. The method of claim 1, wherein the signaling and the payload data messages are filtered based on a list of whitelisted or backlisted identifiers associated with the visited Network Server or the End-Device.

4. The method of claim 1, wherein the signaling and payload data messages are filtered based on existence or absence of a roaming agreement between the visited network and the home network.

5. The method of claim 1, wherein End-Device session contexts are stored, and wherein the device session contexts are used to match the signaling and the payload data messages between the visited Network Server and the home Network Server.

6. The method of claim 1, wherein network identifiers of the Join Server and the home Network Server are configured in the LRCS node, or dynamically resolved via an authoritative DNS server, to respective IP addresses thereof.

7. The method of claim 1, wherein the visited Network Server is statically configured to send the signaling and the payload data messages to the IP address of the LRCS node, or the visited Network Server is configured to dynamically discover the IP address of the LRCS node by querying a DNS with a network identifier of the Join Server or a network identifier of the home Network Server.

8. The method of claim 1, wherein a Message Queuing Telemetry Transport (MQTT) broker module is deployed to enable the home network to subscribe to information based on a network identifier of the home Network Server or an identifier of the End-Device and to receive the payload data messages through a publish procedure of the MQTT broker module.

9. The method of claim 1, wherein the LRCS node functions as a data aggregator for a plurality of Application Servers, whereby the plurality of the Application Servers receives the payload data messages from the MQTT broker module.

10. The method of claim 1, wherein roaming agreements and policies are managed by LRCS based on a network identifier of the home Network Server or an identifier of the End-Device.

11. The method of claim 1, wherein responsive to receiving, by the LRCS node, duplicate messages associated with the End-Device from multiple visited networks within a pre-defined duration of time, identifying a first message sent from the visited Network Server belonging to a preferred visited network and forwarding only the first message to the home Network Server.

12. The method of claim 1, wherein routing information is added to the signaling or payload data messages, thereby enabling the visited Network Server or the home Network Server to verify integrity of a routing path used to deliver the signaling or payload data messages routed via LRCS node.

13. The method of claim 1, wherein the LRCS node is configured to resolve a NwkID value in the signaling and payload data messages to a single network ID (NetID) associated with the home Network Server based on an object from a session database, wherein the object is selected from the group consisting of a DevAddr, a Home NetID, a Frame Counter, a forwarding network session integrity key (FNwk-SIntKey), a serving network session integrity key (SNwk-SIntKey), and a DevEUI, thereby preventing multiple messages being triggered by the visited Network Server when the NwkID object matches more than one NetID of home operators.

14. The method of claim 1, wherein the LRCS node is configured function as a centralized Join Server and a key store to manage security keys on behalf of a plurality of home networks.

15. The method of claim 1, wherein the LRCS node is configured to function as a proxy for the Join Server to exchange the signaling messages between the visited Network Server and the Join Server.

16. The method of claim 1, wherein the LRCS node is configured to extract a Sender ID and a Receiver ID from the signaling and payload messages and using the Sender ID and the Receiver ID to exchange the signaling and payload messages between the visited Network Server and the home Network Server.

17. The method of claim 1, wherein the LRCS node is configured to perform load balancing based on pre-configured routing rules.

18. The method of claim 1, wherein the LRCS node is configured to maintain fair usage policies and is configured to discard the signaling and payload data messages responsive to identifying the End-Device or the visited Network Server as non-compliant.

19. The method of claim 1, wherein the LRCS node is configured to reject the signaling and payload data messages non-compliant with pre-defined rules using a result code selected from the group consisting of LoopedPacket, TemporarilyRoamingDisallowed, TemporarilyRoamingAct-Disllowed, OverlappingRequest and NoResourcesAvailable.

20. A Long Range Wide Area Network (LoRaWAN) Routing and Control System (LRCS) node configured to interface with a visited Network Server and a home Network Server and is configured to route signaling and payload data messages therebetween thereby enabling LoRaWAN roaming for an End-Device belonging to a home network and roaming in a visited network, the LRCS node operating under a set of instructions stored in a non-transitory computer-readable medium, that, when executed by a processor, cause the LRCS node to execute the steps comprising:

receiving a home-network-server-request message sent by the visited Network Server;

identifying an IP address of a Join Server by executing a first DNS query based on a first set of data carried in the request message;

sending the home-network-server-request message to the IP address of the Join Server;

receiving a response message from the Join Server indicating that the End-Device is authorized to roam in the visited network and forwarding the response message to the visited Network Server;

receiving a profile request message from the visited Network Server;

identifying an IP address of the home Network Server by executing a second DNS query based on a second set of data carried in the profile request message;

sending the profile request message to the home Network Server, wherein the home Network Server and receiving a profile answer message from the home Network Server during an over-the-air roaming activation procedure; and proxying subsequent signaling and payload data messages between the visited Network Server and the Home Network Server, wherein the visited Network Server and the home Network Server transmit the subsequent signaling and data messages to the IP address of the LRCS node.

\* \* \* \* \*